United States Patent [19]

Schoening et al.

[11] Patent Number: 4,657,732
[45] Date of Patent: Apr. 14, 1987

[54] HIGH TEMPERATURE REACTOR WITH SPHERICAL FUEL ELEMENTS

[75] Inventors: Josef Schoening, Hambruecken; Claus Elter, Bad Durkheim, both of Fed. Rep. of Germany

[73] Assignee: Hochtemperatur-Reaktorbau GmbH, Fed. Rep. of Germany

[21] Appl. No.: 687,963

[22] Filed: Dec. 31, 1984

[30] Foreign Application Priority Data

Jan. 18, 1984 [DE] Fed. Rep. of Germany ....... 3401498

[51] Int. Cl.[4] .............................................. G21C 13/10
[52] U.S. Cl. ..................................... 376/314; 376/381
[58] Field of Search ............... 376/277, 283, 293, 294, 376/295, 296, 305, 308, 309, 310, 313, 314, 381, 382, 383

[56] References Cited

U.S. PATENT DOCUMENTS

| 2,809,931 | 10/1957 | Daniels | 376/381 |
| 3,322,141 | 5/1967 | Gans, Jr. et al. | 376/314 |
| 4,383,969 | 5/1983 | Bleier | 376/314 |

FOREIGN PATENT DOCUMENTS

| 1564783 | 9/1970 | Fed. Rep. of Germany . | |
| 2732774 | 7/1977 | Fed. Rep. of Germany . | |
| 3141734 | 10/1981 | Fed. Rep. of Germany . | |
| 2315318 | 10/1981 | Fed. Rep. of Germany . | |
| 2315319 | 10/1981 | Fed. Rep. of Germany . | |
| 3212322 | 10/1983 | Fed. Rep. of Germany | 376/283 |
| 54-20298 | 2/1979 | Japan | 376/314 |
| 1166640 | 10/1969 | United Kingdom . | |

Primary Examiner—Deborah L. Kyle
Assistant Examiner—Richard L. Klein
Attorney, Agent, or Firm—Robert J. Koch

[57] ABSTRACT

A barrier system for a high temperature reactor. The reactor utilizes spherical fuel elements consisting of coated particles of a fissionable material embedded in a graphite matrix, the coating forming a first safety barrier against the release of fissionable material, and the graphite matrix a second such safety barrier. The reactor is surrounded by a prestressed concrete pressure vessel clad on the inside with a metal liner. The metal liner acts as a third safety barrier, while the concrete body of the prestressed concrete pressure vessel forms the fourth, and outermost safety barrier. A plurality of passages are located in the pressure vessel which are closed off by closure means. The closure means provide sealment between the third and fourth barriers in the area of the passages. By utilizing the concrete pressure vessel as a safety barrier in this manner, the need for a separate protective reactor housing is eliminated.

10 Claims, 1 Drawing Figure

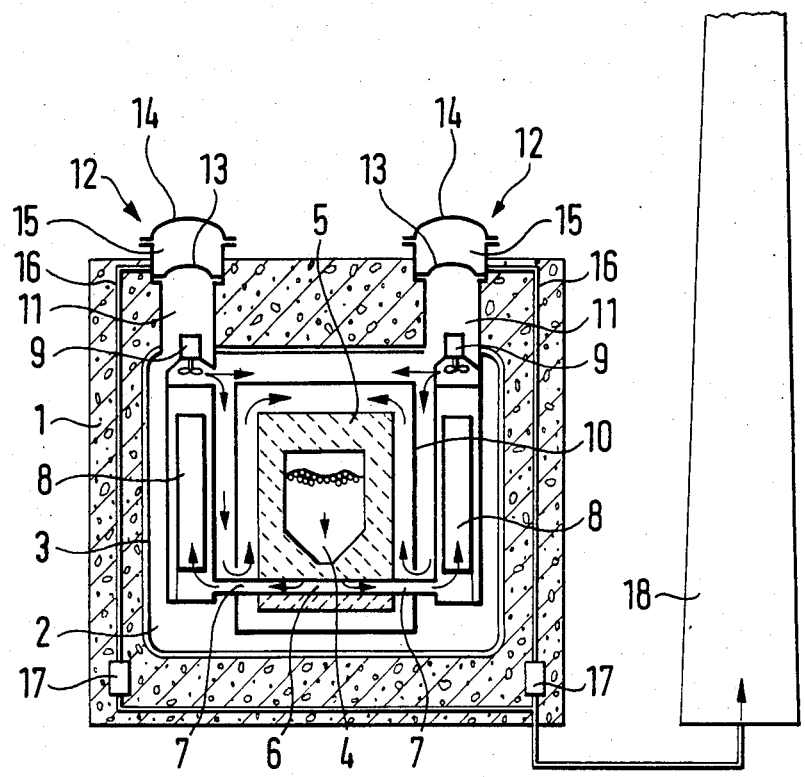

HIGH TEMPERATURE REACTOR WITH SPHERICAL FUEL ELEMENTS

This invention relates generally to the art of nuclear reactor designs, and more particularly, to high temperature reactors. Specifically, the invention concerns improvements in safety barrier designs for such reactors, in which the need for separate reactor containment buildings is eliminated, without comprising reactor safety.

BACKGROUND OF THE INVENTION

In the known structural configurations of nuclear reactors, the pressurized enclosure of the primary loop performs a pressure-containing function and a sealing function, such that the release of fission products to the environment in normal operation and in design base events is limited to values below maximum permissible limits.

In certain types of nuclear reactors, both the pressure-containing function and the sealing function for the primary loop are performed by a single wall steel pressure vessel. The loss of the pressure containment function, such as in a catastrophic failure of the pressure vessel, is prevented by redundant measures, for example, design for basis safety, quality control and operational surveillance. As it is assumed that leakage will precede fracturing, a safety container surrounding the steel pressure vessel is required as a redundant barrier against the release of fission products. In this manner, the pressurized containment of the primary loop is secured against failure even in relation to the sealing function. A safety container as a redundant barrier against the loss of the sealing function is required primarily because the reactor coolant has a high radioactivity content. Nuclear reactors of this type are described, for example, in German Auslegeschrift No. 23 15 318 and German Offenlegungsschrift No. 23 15 319.

In the case of a high temperature reactor with spherical fuel elements, the fissionable material is coated to form the spherical elements, which are then embedded in a graphite matrix. The coating and the graphite matrix form a first barrier and a second barrier, respectively, against release of fission products. In addition, two further barriers are provided against the release of fission products. These are formed by the reactor pressure vessel (with a sealing function and a failure-safe pressure containment function) and the protective reactor housing (with a sealing and a pressure containment function). The reactor pressure vessel may be made of steel or prestressed concrete and the protective reactor housing of steel or concrete.

A nuclear reactor of this structural type is known for example from German Offenlegungsschrift No. 32 12 322 which corresponds to United States Application Ser. No. 718,193, in continuation of Ser. No. 481,749. In such an installation, construction costs are very high, because the protective reactor housing must function not only as a safety container for the primary loop, but must also act as a structural enclosure for the reactor pressure vessel and the operating installations of the reactor, that is, it must function as the protective barrier against effects from the external environment.

In a high temperature reactor with a prestressed concrete pressure vessel, all of the components of the primary loop are located in a cavity (or several cavities) of the prestressed concrete pressure vessel, which, for installation and disassembly and to receive the components, comprises a plurality of large passages. Tight enclosure of the primary loop is effected in the area of these passages by means of closure devices, which close off the passages in a pressurized and gas-tight manner. A nuclear reactor with a prestressed concrete pressure vessel comprising such passages and closure devices is described in German Offenlegungsschrift No. 31 41 734. The closure devices consist in each case of a double steel cover set into the passage involved. The inner cover represents the seal for the primary gas. In this installation, again, a tight protective reactor building must be present.

German Offenlegungsschrift No. 15 14 783 also discloses the principle of using double covers as a safety closure for nuclear reactor pressure vessels.

SUMMARY OF THE INVENTION

It is an object of the invention to reduce the construction requirements for multiple barriers against release of fission products in a high temperature reactor of the above-mentioned type, for reasons of economy and technical reliability, without compromising the sealing function of the pressurized enclosure of the primary loop.

According to the invention, this object is attained by utilizing the concrete body of the prestressed concrete pressure vessel and the liner of the vessel as the fourth and the third barriers, respectively, against the release of fission products. In the area of the passages through the pressure vessel, the sealing function of the third and fourth barrier is performed by known closure devices made of double steel covers arranged in the passages, with the inner cover forming the seal of the primary gas. The spaces between the outer and the inner covers are, in each case, connected to a pipeline, which conducts leakages of the primary gas into an exhaust stack through a filter system for the retention of the fission products.

Further objects, features and advantages of the present application will become apparent from the detailed description of preferred embodiments, which follows, when considered together with the attached figure.

BRIEF DESCRIPTION OF THE DRAWING

In the drawing, an example of an embodiment of a hightemperature reactor of the invention is shown schematically, with the high temperature reactor represented in the longitudinal section.

DETAILED DESCRIPTION OF THE PREFERRED EMBODIMENTS

The invention applies the principle of redundant design in order to seal a primary loop integrated into a prestressed concrete pressure vessel in a failure-safe manner. The prestressed concrete pressure vessel has two redundant seals, namely, a metal liner and a concrete body, which acts as an effective flow limitation. A precondition is that the radioactivity passing through the concrete body must be less than the value permitted for the installation in view of the environment. If this is not the case, the reactor must be shut down as a consequence of a "liner leak". If the condition is satisfied, the reactor may continue in operation, as the redundant seal of the concrete body is failure-safe.

In the case of a leak of the inner cover of one of the closure devices, the escaping primary gas is discharged through a filter system and exhaust stack into the environment, while the fission products are retained in the filter system. In the space between the inner and outer covers, therefore, no appreciable excess pressure can be built up, so that the outer cover is failure-safe eve in relation to the sealing function. The outer cover, forming the fourth barrier, is thus comparable to the safety housing of the above-described nuclear reactor installation with a steel reactor pressure vessel.

As radioactivity cannot escape into the environment from the primary loop through the prestressed concrete pressure vessel, or the closure devices of the passages, a tight safety housing is no longer necessary, and the tasks of containing the primary gas in a failure-safe manner and protecting the high temperature reactor against outside effects may be performed by the concrete pressure vessel alone. The additional construction effort required is relatively small, consisting essentially of the closure devices with the exhaust of the intermediate spaces. The invention thus makes possible the construction of a high temperature reactor in a highly economical manner, as no safety-associated reactor protection building is required.

It is advantageous to locate the pipelines for the removal of primary gas leakages, to their connection with the exhaust stack, extensively in the concrete of the reinforced concrete pressure vessel, in order to contribute to the reduction of the risk potential of said pipelines, and for environmental reasons. The filter systems for the retention of fission products may also be installed within the walls of the prestressed concrete pressure vessel, thereby serving the same purpose.

In order to provide securement against external catastrophes, such as an airplane collision, the prestressed concrete pressure vessel may be equipped with an appropriately designed protective installation. This may consist, for example, of a concrete building which simultaneously serves as the architectonic enclosure of the installations of the nuclear reactor. As this building is not charged with radioactivity from the primary loop, it may be structurally simple.

A preferred embodiment of the invention can be seen with reference to the drawing. A cylindrical prestressed concrete pressure vessel 1 comprises a center cavity 2, which is clad with a metal liner 3. In the cavity 2, a high temperature reactor 4 is arranged, the core thereof comprising a pile of spherical fuel elements. The fuel elements consist of coated fissionable material particles embedded in a graphite matrix. The graphite matrix and the coating represent a first and a second barrier against the release of fission products.

A cooling gas, e.g., helium, flows from top to bottom through the pile, as indicated by arrows in the figure. It is surrounded on all sides by a reflector 5, which is followed below by a hot gas collector space 6. The hot gas collector space is connected by the hot gas channel 7 with a plurality of steam generators 8 arranged about the high temperature reactor 4 in the cavity 2. Several circulating blowers 9 convey the cold cooling gas back into the reactor core. The reflector 5 is surrounded by a thermal shield 10, which also defines the guides for the return of the cold cooling gas.

The prestressed concrete pressure vessel 1 comprises several large passages 11 in its roof area, each of which is closed off by a closure device 12. The circulating blowers 9 are arranged in part in said passages, thereby serving the purpose of installation and disassembly of the steam generators 8, and of other reactor components. Each closure device consists of two steel covers 13 and 14 arranged above each other, of which the inner cover 13 forms the seal for the primary gas.

Between the two covers 13 and 14 of each closure device 12, an intermediate space 15 is present, and to which a pipeline 16 is connected. This pipeline, which is located for the most part in the concrete of the concrete pressure vessel 1, is connected through a filter system 17 to an exhaust stack 18. The filter system provides for the retention of fission products. To reduce the potential danger, in addition to the pipelines 16, the filter systems 17 are also arranged in the wall of the prestressed concrete pressure vessel 1.

In place of the protective reactor building usually provided, and which forms the outermost barrier against the release of fission products, the instant invention provides for the prestressed concrete pressure vessel 1 as a barrier system. The liner thereof acts as a third barrier, and the concrete body, which provides for an extremely tight flow limitation, acts as the fourth and outermost barrier. The prestressed concrete pressure vessel thus has two redundant seals. In the area of the passages 11, the third and the fourth barriers comprise inner covers 13 and outer cover 14 of closure devices 12. In the case of leakage through the inner covers 13 into intermediate spaces 15, the outer covers 14, which are dimensioned for full design pressure, are not stressed appreciably due to the exhausting of the intermediate space through the pipelines 16, thus, they are failure safe as regards their sealing function. There is no need, consequently, for a tight protective reactor building.

What is claimed is:

1. A high temperature nuclear reactor barrier system comprising a plurality of barriers to prevent a release of radioactivity wherein;

a first barrier comprises a coating over fissionable material in reactor fuel elements;

a second barrier comprises a graphite matrix in which said fuel elements are embedded;

a third barrier comprises a pressure vessel metal liner;

a fourth barrier comprises in combination a concrete body of a prestressed concrete pressure vessel, a plurality of closure devices affixed to passages in the concrete pressure vessel, wherein said closure devices include inner and outer covers defining intermediate spaces therebetween, said inner covers forming a primary gas seal, and a plurality of conduits connected to said intermediate spaces for removing exhaust leakage of primary gas passing into said intermediate space;

means for retention of fission products in said conduits, wherein said means for retention of fission products is a filter and further comprising means for exhausting filtered gas in said conduits outside said prestressed concrete pressure vessel, said means for exhausting comprises an exhaust stack attached to said conduits downstream from said filter and extending outside said prestressed concrete pressure vessel; and wherein the conduits are positioned within the concrete body of the prestressed concrete pressure vessel up to their connection with the exhaust stack.

2. A barrier system as in claim 1, wherein the prestressed concrete pressure vessel operates as a protective installation which can withstand collision with aircraft.

3. A high temperature reactor installation comprising:
- a reactor enclosed in a prestressed concrete pressure vessel wherein said pressure vessel exhibits a plurality of passages;
- a barrier system comprises a plurality of barriers to prevent a release of radioactivity wherein;
- a first barrier comprises a coating over fissionable material in spherical fuel elements utilized by said reactor;
- a second barrier comprises a graphite matrix in which said fuel elements are embedded;
- a third barrier comprises a metal liner clad to an interior surface of said pressure vessel; and
- a fourth barrier comprises in combination, a concrete body of the prestressed concrete pressure vessel, a plurality of closure devices affixed to the outer passages, said closure devices include inner and outer covers defining defining intermediate spaces therebetween, said inner covers forming primary gas seals, a plurality of conduits connected to said intermediate spaces for removing exhaust leakage of primary gas passing into said intermediate space;
- means for retention of fission products in said conduits wherein said means for retention of fission products is a filter and further comprising means for exhausting filtered gas in said conduits outside said prestressed concrete pressure vessel; and
- wherein the filters are located in the concrete body of the prestressed concrete pressure vessel.

4. A high temperature reactor installation as in claim 3, wherein said means for exhausting comprises an exhaust stack attached to said conduits downstream from said filter and extending outside said prestressed concrete pressure vessel.

5. A high temperature reactor installation as in claim 4, wherein the conduits are positioned in the concrete body of the prestresed concrete pressure vessel up to their connection with the exhaust stack.

6. A high temperature reactor installation as in claim 3, wherein the prestressed concrete pressure vessel operates as a protective installation which can withstand collision with aircraft.

7. A high temperature nuclear reactor barrier system comprising a plurality of barriers to prevent a release of radioactivity wherein:
- a first barrier comprises a coating over fissionable material in reactor fuel elements;
- a second barrier comprises a graphite matrix in which said fuel elements are embedded;
- a third barrier comprises a pressure vessel metal liner; and
- a fourth barrier comprises in combination a concrete body of a prestressed concrete pressure vessel, a plurality of closure devices affixed to passages in the concrete pressure vessel, wherein said closure devices include inner and outer covers defining intermediate spaces therebetween, said inner covers forming a primary gas seal, a plurality of conduits connected to said intermediate spaces for removing exhaust leakage of primary gas passing into said intermediate space, and
- means for retention of fission products in said conduits wherein said means for retention of fission products is a filter and further comprising means for exhausting filtered gas in said conduits outside said prestressed concrete pressure vessel, and
- wherein the filters are located in the concrete body of the prestressed concrete pressure vessel.

8. A barrier system as in claim 7, wherein said means for exhausting comprises an exhaust stack attached to said conduits downstream from said filter and extending outside said prestressed concrete pressure vessel.

9. A barrier system as in claim 8, wherein the conduits are positioned within the concrete body of the prestressed concrete pressure vessel up to their connection with the exhaust stack.

10. A barrier system as in claim 7, wherein the prestressed concrete pressure vessel is a protective installation which can withstand an aircraft collision.

* * * * *